(12) United States Patent
Sakashita et al.

(10) Patent No.: US 10,863,056 B2
(45) Date of Patent: Dec. 8, 2020

(54) LOGIN SUPPORT SYSTEM THAT SUPPORTS LOGIN TO ELECTRONIC APPARATUS

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 57 days.

(21) Appl. No.: 16/293,927

(22) Filed: Mar. 6, 2019

(65) Prior Publication Data

US 2019/0281187 A1 Sep. 12, 2019

(30) Foreign Application Priority Data

Mar. 9, 2018 (JP) ................. 2018-043317

(51) Int. Cl.
*H04N 1/44* (2006.01)
*G06K 9/00* (2006.01)

(52) U.S. Cl.
CPC ......... *H04N 1/442* (2013.01); *G06K 9/00288* (2013.01); *G06K 9/00355* (2013.01)

(58) Field of Classification Search
CPC .. H04N 1/442; H04N 1/4433; G06K 9/00288; G06K 9/00355; G06K 9/00295; G06K 9/00677; G06T 7/20
See application file for complete search history.

(56) References Cited

U.S. PATENT DOCUMENTS

| | | | |
|---|---|---|---|
| 10,528,145 B1* | 1/2020 | Zhang | G06F 3/017 |
| 10,601,821 B2* | 3/2020 | Du | G06K 9/00241 |
| 2007/0122007 A1* | 5/2007 | Austin | G06K 9/00221 382/118 |
| 2013/0073625 A1* | 3/2013 | Umetsu | G06Q 10/1095 709/204 |

(Continued)

FOREIGN PATENT DOCUMENTS

JP 2007-233916 A 9/2007

*Primary Examiner* — Jingge Wu
(74) *Attorney, Agent, or Firm* — IP Business Solutions, LLC

(57) ABSTRACT

A login support system includes an electronic apparatus, a camera, a storage unit, and a control unit that includes a processor and acts, when the processor executes a login support control program, as a face authentication section, a gesture determination section, and a controller. The face authentication section extracts a face image of a person from a captured image captured by the camera and, when the extracted face image coincides with any of pieces of face information stored in the storing unit, authenticates the extracted face image. The gesture determination section detects a gesture of a person on a basis of the captured image and determines whether the detected gesture coincides with a prescribed gesture. When the face image of the person is authenticated and the gesture of the person is determined as coinciding with the prescribed gesture, the controller permits a login to the electronic apparatus to that person.

6 Claims, 5 Drawing Sheets

(56) References Cited

U.S. PATENT DOCUMENTS

| | | | | |
|---|---|---|---|---|
| 2014/0013417 A1* | 1/2014 | Sakai | .................... | G06F 3/005 |
| | | | | 726/16 |
| 2016/0373437 A1* | 12/2016 | He | .................... | H04L 63/0861 |
| 2017/0180362 A1* | 6/2017 | Du | .................... | G06F 21/35 |
| 2018/0359595 A1* | 12/2018 | Son | .................... | H04R 3/12 |
| 2019/0166119 A1* | 5/2019 | Hecker | ............ | G06K 9/00926 |

* cited by examiner

Fig.2

| ID | NAME | FACE FEATURE POINTS (FACE INFORMATION) | HAND GESTURE |
|---|---|---|---|
| A | aaa | POSITIONS OF EYES ea, POSITION OF NOSE na, ...... | WAVE |
| B | bbb | POSITIONS OF EYES eb, POSITION OF NOSE nb, ...... | LIFT |
| C | ccc | POSITIONS OF EYES ec, POSITION OF NOSE nc, ...... | RAISE THE THUMB |
| D | ddd | POSITIONS OF EYES ed, POSITION OF NOSE nd, ...... | MAKE A PEACE SIGN |
| E | eee | POSITIONS OF EYES ee, POSITION OF NOSE ne, ...... | OPEN THE PALM |
| F | fff | POSITIONS OF EYES ef, POSITION OF NOSE nf, ...... | FORM A FIST |

DT

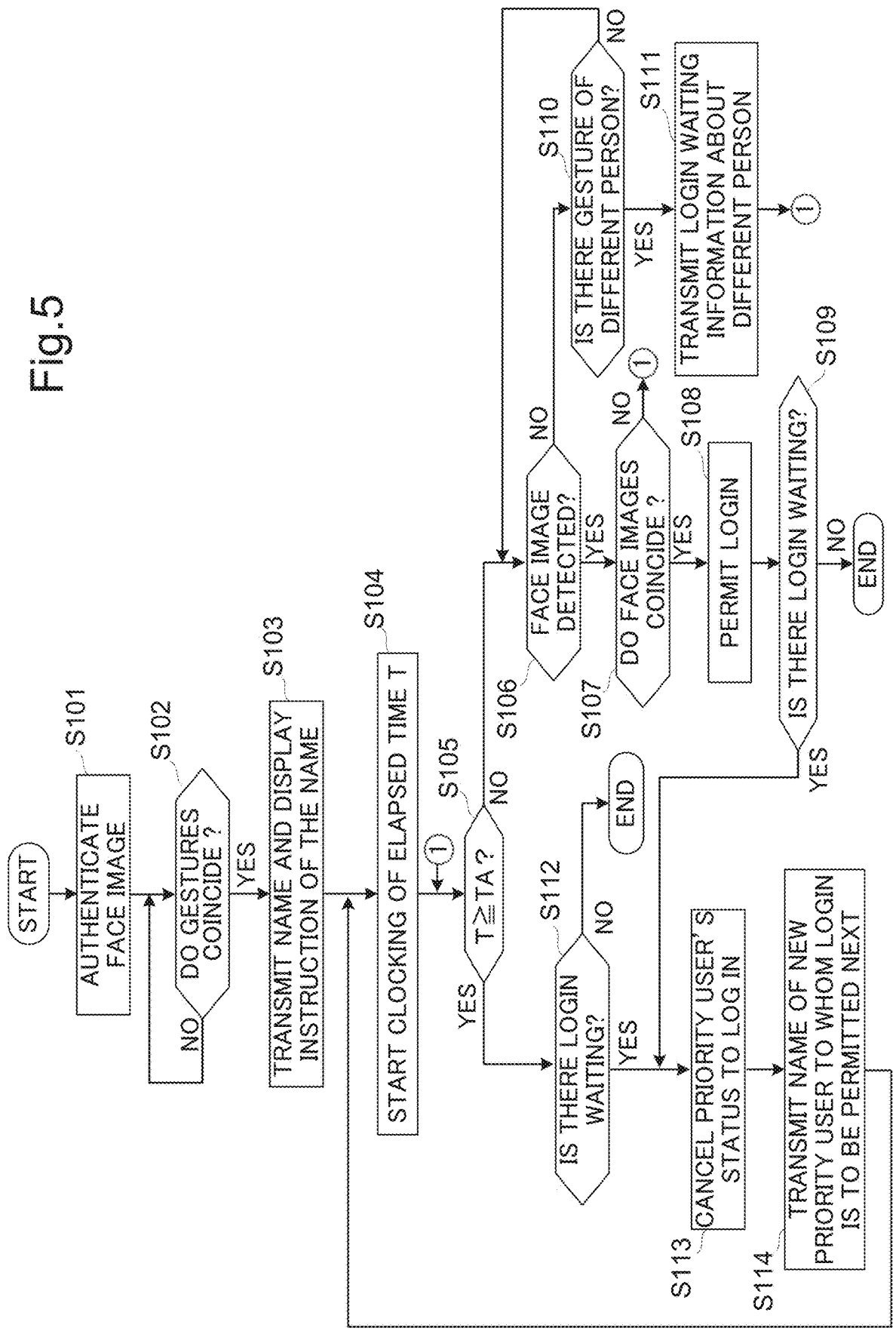

LOGIN SUPPORT SYSTEM THAT SUPPORTS LOGIN TO ELECTRONIC APPARATUS

INCORPORATION BY REFERENCE

This application claims priority to Japanese Patent Application No. 2018-043317 filed on Mar. 9, 2018, the entire contents of which are incorporated by reference herein.

BACKGROUND

The present disclosure relates to login support systems that support logins to electronic apparatuses, and information processing apparatuses.

As a system that permits use of an apparatus only to a certain user, there is for example a general system described as follows. Prior to entering a management room, ID information entered by a person through an authentication device of an entry leader is collated with pre-registered ID information, and when these ID information coincide with each other, a face image of the person is taken by a first camera. The photographed face image is stored, into a storage device of the entry leader, as an original face image. Then, an electric lock is unlocked and entry into the management room becomes possible. In the management room, before the apparatus is used, the face image of the person is taken by a second camera, and this photographed face image is collated with the stored original face image. When these face images coincide with each other, that is, when the face is authenticated, the use of the apparatus by that person is permitted.

In the aforesaid general system, as the apparatus, it is possible to apply an image forming apparatus forming an image on recording sheet. In such case, when the original face image photographed by the first camera in entering into the room coincides with the face image photographed by the second camera before the use of the image forming apparatus, and the face image is authenticated, a login to the image forming apparatus is to be permitted.

SUMMARY

A technique improved over the aforementioned technique is proposed as one aspect of the present disclosure.

A login support system according to one aspect of the present disclosure includes an electronic apparatus, a camera, a storage unit, a control unit. The camera is installed in a room with the electronic apparatus and captures an inside of the room. The storage unit stores pieces of face information, each of the pieces of face information being associated with a respective plurality of persons. The control unit includes a processor and acts, when the processor executes a login support control program, as a face authentication section, a gesture determination section, and a controller. The face authentication section extracts a face image of a person from a captured image captured by the camera and, when the extracted face image of the person coincides with any of the pieces of face information that is stored in the storing unit and each associated with the respective plurality of persons, authenticates the extracted face image of the person. The gesture determination section detects a gesture of a person on a basis of the captured image captured by the camera, and determines whether the detected gesture coincides with a prescribed gesture. When the face authentication section has authenticated the face image of the person and the gesture determination section has determined that the gesture of the person whose face image has been authenticated coincides with the prescribed gesture, the controller permits a login to the electronic apparatus to the person.

An information processing apparatus according to another aspect of the present disclosure includes a control unit. The control unit includes a processor and acts, when the processor executes a login support control program, as a face authentication section, a gesture determination section, and a controller. The face authentication section extracts a face image of a person from a captured image captured by a camera that is installed in a room with an electronic apparatus and captures an inside of the room and, when the extracted face image of the person coincides with any of the pieces of face information that is stored in the storing unit and each associated with the respective plurality of persons, authenticates the extracted face image of the person. The gesture determination section detects a gesture of a person on a basis of the captured image captured by the camera, and determines whether the detected gesture coincides with a prescribed gesture. When the face authentication section has authenticated the face image of the person and the gesture determination section has determined that the gesture of the person whose face image has been authenticated coincides with the prescribed gesture, the controller permits a login to the electronic apparatus to the person.

BRIEF DESCRIPTION OF THE DRAWINGS

FIG. 2 is a view conceptually showing a data table stored in a person data storage unit.

FIG. 5 is a flowchart showing processing procedures until a permission to log in to the image forming apparatus is given that is performed by the server.

DETAILED DESCRIPTION

Hereinafter, a description will be given of a login support system according to one embodiment of the present disclosure with reference to the drawings.

Figure 1:
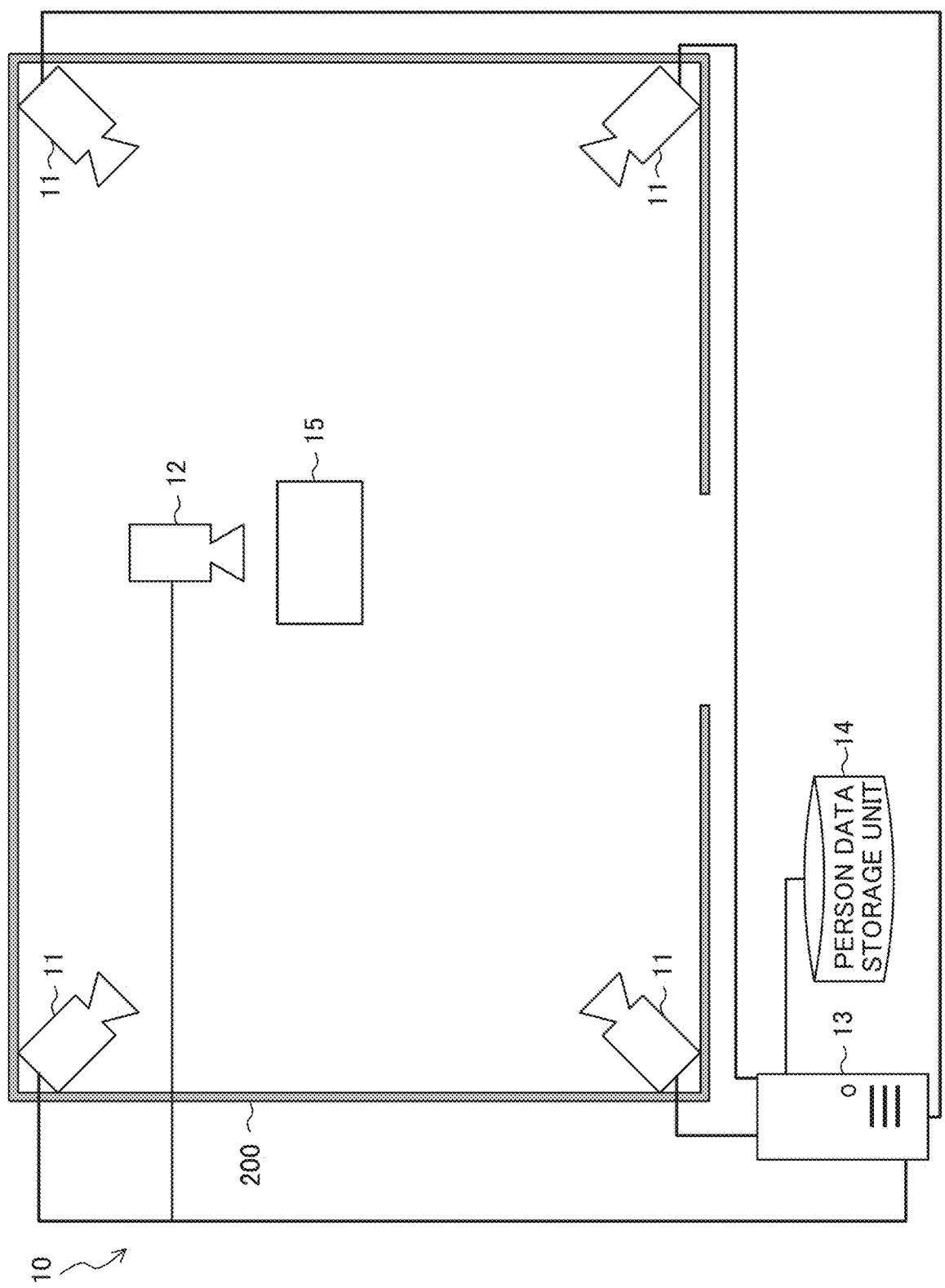
FIG. 1 is a diagram showing a schematic configuration of a login support system according to one embodiment of the present disclosure.

FIG. 1 is a diagram showing a schematic configuration of the login support system according to the one embodiment of the present disclosure. A login support system 10 according to the one embodiment of the present disclosure includes a plurality of cameras 11, a camera 12, a server 13, a person data storage unit 14, and an image forming apparatus (an example of an electronic apparatus) 15.

The plurality of cameras 11 is installed at positions in a room 200 where an inside of the room 200 can be entirely imaged, and captures images of all persons present in the room 200. The camera 12 is provided at a position capable of capturing an image of a person who moves to the front of the image forming apparatus 15, and captures the image of the person who moves to the front of the image forming apparatus 15 for the purpose of using the image forming apparatus 15. These cameras 11, 12 are connected to the server 13 and each transmits each of the captured images to the server 13.

The person data storage unit 14 is, for example, formed of a database storing identity information of each person. As an example is shown in FIG. 2, the person data storage unit 14 stores a data table DT memorizing, in association with each other, an ID, a name, face feature points, and a hand gesture of each of the plurality of persons permitted to enter and leave the room 200. The face feature points are pieces of face information representing, for example, positions of eyes, a position of nose, and positions of corners of the mouth. There are multiple kinds in the hand gesture, and the hand gesture is individually set for each person.

Figure 3:
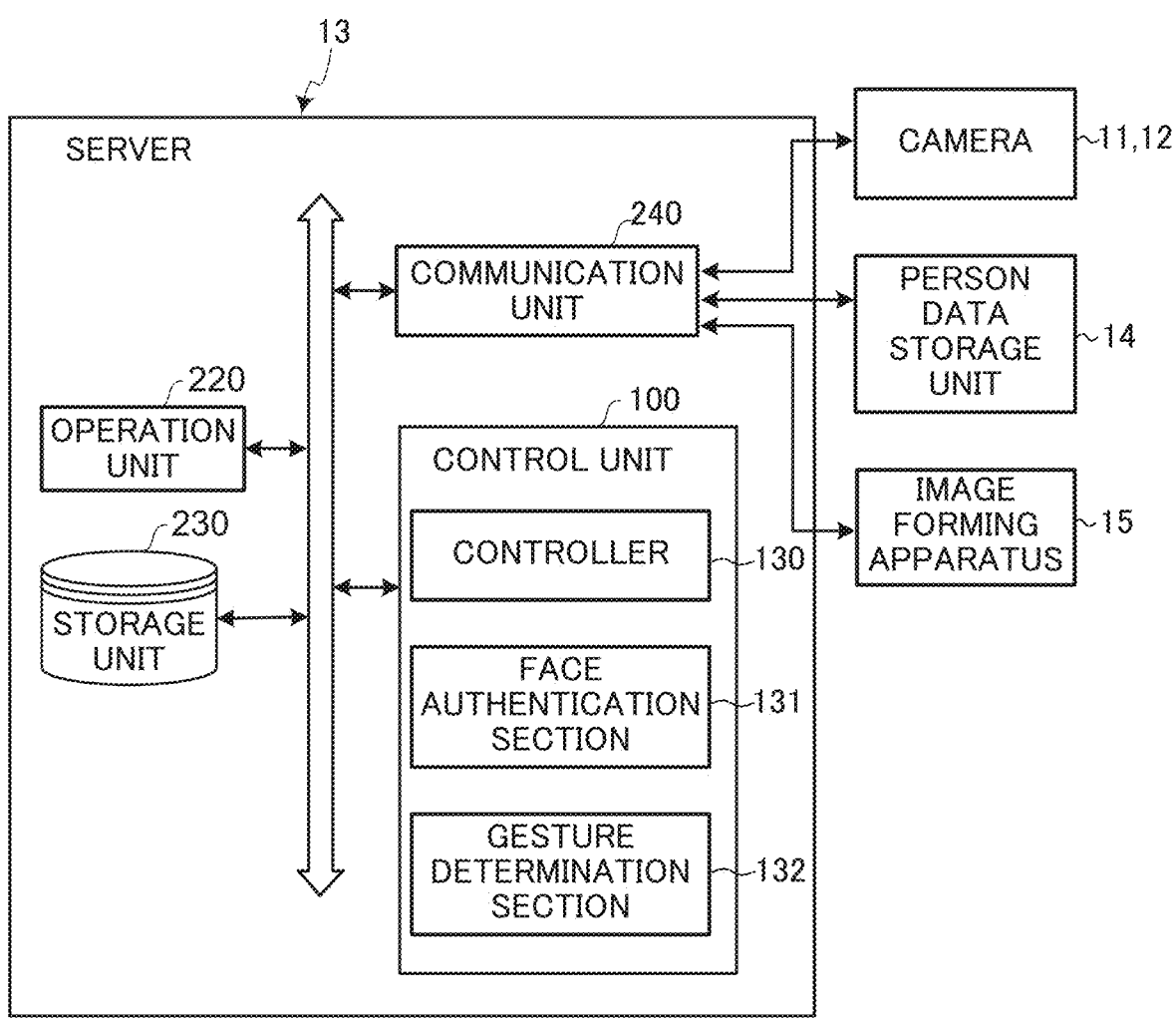
FIG. 3 is a block diagram showing a main part of a server.

The server 13 will be detailed. FIG. 3 is a block diagram showing a main part of the server 13. The server 13 includes a control unit 100, an operation unit 220, a storage unit 230, and a communication unit 240. The server 13 is an example of the information processing apparatus in What is claimed is. The operation unit 220 is an input device such as a mouse and a key board. The storage unit 230 is a memory device such as an SSD (Solid State Drive) or a flash memory.

The communication unit 240 is a communication interface that includes a LAN (Local Area Network) chip and the like. The communication unit 240 is connected, via the LAN or the network of the internet, to each of the cameras 11, 12, the person data storage unit 14, and the image forming apparatus 15 so as to be capable of transmitting and receiving data to and from each of the cameras 11, 12, the person data storage unit 14, and the image forming apparatus 15. For example, the captured images transmitted from the cameras 11, 12 received by the communication unit 240, temporarily stored in the storage unit 230, and to be targeted for processing by the control unit 100.

The control unit 100 includes a processor, a RAM (Random Access Memory), a ROM (Read Only Memory), and an exclusive hardware circuit. The processor is, for example, a CPU (Central Processing Unit), an ASIC (Application Specific Integrated Circuit), or an MPU (Micro Processing Unit). The control unit 100 acts as, in accordance with an operation by the processor in response to a login support control program stored in the storage unit 230, a controller 130, a face authentication section 131, and a gesture determination section 131. The controller 130, the face authentication section 131, and the gesture determination section 131, however, may each be configured by a hardware circuit, instead of acting in accordance with the login support control program by the control unit 100.

The controller 130 governs the overall operation control of the server 13.

The face authentication section 131 performs a known face recognition process on each of the captured images that are captured by each of the cameras 11, 12 and stored in the storage unit 230, detects a face image of one or more persons in the captured image, and extracts feature points of the detected face image. Furthermore, the face authentication section 131 collates the feature points of the extracted face image with the feature points of the face (face information) of each person, which is stored in the person data storage unit 14, and, when the feature points of the detected face image coincide with any of feature points of the face of each person, authenticates the detected face image as a face image of a candidate to Whom a login to the image forming apparatus 15 is to be permitted.

On the basis of the position and orientation of the face image authenticated by the face authentication unit 131, a gesture determination section 132 determines, for each of the captured images that is captured by the cameras 11, 12 and stored in the storage unit 230, a position of a hand of the person (that is, the person stored in the storage unit 230 in associated with the feature points that coincide with the feature points of the face image detected by the face authentication unit 13) who has the face image, and detects various kinds of hand gestures performed by the hand of this person with a known gesture detecting technique. Also, the gesture determination section 132 reads out, from the person data storage unit 14, the hand gesture associated with the person who has the face image having been authenticated by the face authentication section 131, and determines whether the detected face image coincides with the feature points of the read out face image.

Figure 4:
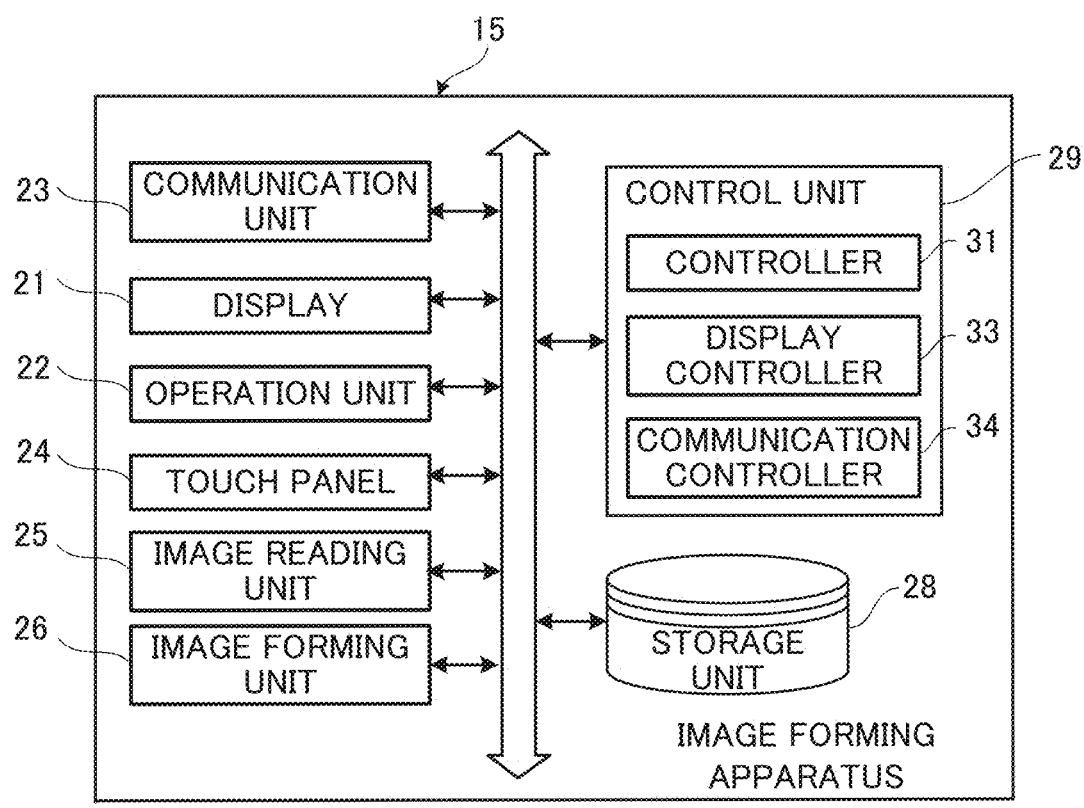
FIG. 4 is a block diagram showing a main part of an image forming apparatus.

The image forming apparatus 15 is detailed next. FIG. 4 is a block diagram showing a main part of the image forming apparatus 15. The image forming apparatus 15 includes a display 21, an operation unit 22, a communication unit 23, a touch panel 24, an image reading unit 25, an image forming unit 26, a storage unit 28, and a control unit 29. These constituent elements of the image forming apparatus 15 are capable of transmitting and receiving data and signals to and from each other via a bus.

The display 21 is constituted of, for example, a liquid crystal display (LCD) or an organic light-emitting diode (OLED) display. The operation unit 22 includes hard keys such as a numeric keypad, a determination key, and a start key.

A screen of the display 21 is provided with the touch panel 24. The touch panel 24 is of, for example, a so-called resistive film type or a capacitance type, and detects contact (touch) on the touch panel 24 made by a user's finger together with a position of this contact. Upon the contact of the finger, the touch panel 24 outputs a detection signal indicating coordinates of the position of the aforementioned contact, for example, to a controller 31 (to be described later on) of the control unit 29.

The communication unit 23 is a communication interface including a communication module such as a LAN chip. The communication unit 23 is connected to the server 13 via a network, and transmits and receives data to and from the server 13.

The image reading unit 25 includes a scanner that optically reads an original document placed on a contact glass. The image reading unit 25 forms image data of an image of the original document.

The image forming unit 26 includes for example: a photoconductor drum; a charging device that uniformly charges a surface of the photoconductor drum; an exposure device that exposes the surface of the photoconductor drum to form an electrostatic latent image on the surface of the photoconductor drum; a developing device that develops the electrostatic latent image formed on the surface of the photoconductor drum into a toner image; and a transfer device that transfers the toner image (image) on the surface of the photoconductor drum to a recording sheet. The image forming unit 26 forms an image of the image data onto the recording sheet.

The storage unit 28 is a large-capacity storage device such as the SSD or an HDD (Hard Disk Drive), and stores various kinds of application programs, information, and so on.

The control unit 29 includes, for example, a processor, a RAM, and a ROM. The processor is, for example, the CPU, the MPU, or the ASIC. The control unit 29 acts as, upon execution of a control program stored in the ROM or the storage unit 28 by the processor, the controller 31, a display controller 33, and a communication controller 34.

The control unit 29 collectively controls the image forming apparatus 15 and is connected to, for example, the display 21, the operation unit 22, the communication unit 23, the touch panel 24, the image reading unit 25, the image forming unit 26, and the storage unit 28. The control unit 29 performs operation control of these constituent elements and transmits and receives data and signals among each of the constituent elements.

The controller 31 serves a role as a processing part that performs various processing required for image formation by the image forming apparatus 15. The display controller 33 has a function of controlling, under the control by the controller 31, a display operation of the display 21. The communication controller 34 has a function of controlling a communication operation of the communication unit 23.

As a general method in using the image forming apparatus 15, there is a method of permitting the use of the image forming apparatus 15, for example, after authentication of the user by the ID card is performed. Such method requires the ID card in order to receive use authentication of the image forming apparatus 15, and this makes the operation troublesome.

In the present embodiment, at the server 13, as described above, the face authentication section 131 detects the face image of the person from the captured image captured by each of the cameras 11, 12, and, when the feature points of the detected face image coincide with any of the feature points of each person stored in the person data storage unit 14, authenticates the detected face image as the face image of the candidate to whom the login to the image forming apparatus 15 is to be permitted. The gesture determination section 132 detects the hand gesture of the person in the captured image, reads out from the person data storage unit 14 the hand gesture associated with the feature points of the detected person's face image, and determines whether the detected hand gesture of the person coincides with the read out hand gesture. Then, upon authenticating the face image of the person by the face authentication section 131 and determining by the gesture determination section 132 that the hand gesture of that person coincides with the read out hand gesture, the controller 130 permits the login to the image forming apparatus 15 by that person. Therefore, that person (user) does not need to perform the operation for the authentication using the ID card.

In addition, because the login to h image forming apparatus 15 is permitted based not only on the authentication of the face image performed by the face authentication section 131, but also on the determination of the hand gesture performed by the gesture determination section 132, even in a situation where the face images of a plurality of persons are authenticated, it is possible to permit the login to the image forming apparatus 15 only for one person based on the determination of the hand gesture as described later on.

Operations of the login support system 10 will be detailed next. FIG. 5 is a flowchart showing processing procedures until a permission to log in to the image forming apparatus 15 is given that is performed by the server 13.

Each of the cameras 11 captures images of all persons present in the room 200 and transmits the captured images to thee server 13. The camera 12 captures the image of the person who moves to the front of the image forming apparatus 15 and transmits the captured image to the server 13. At the server 13, those captured images are received by the communication unit 240 and are temporality stored in the storage unit 230. The face authentication section 131 detects, for each of the captured images captured by the cameras 11, 12, the face image of the person or the face images of the persons, and extracts the feature points of the detected face images. Furthermore, the face authentication section 131 collates the feature points of the extracted face images with feature points of the face of each person stored in the person data storage unit 14, and, when the feature points of the detected face images coincide with any feature points of the face of any person, authenticates the detected face images as the face image of the candidate to whom the login to the image forming apparatus 15 is to be permitted (S101).

Then, when each person (the candidate) whose face image has been detected performs a hand gesture, at least one of the cameras 11 and 12 captures the hand gesture of the person, and transmits the captured image to the server 13. At the server 13, the captured images are received by the communication unit 240 and are stored temporality by the storage unit 230. The gesture determination section 132 of the server 13 detects, as described above, the hand gesture of each person (the candidate) in respective captured images stored in the storage unit 230, reads out, from the person data storage unit 14, the hand gesture associated with the feature points of the face image of each person, and determines whether the detected hand gesture of each person coincides with the read out hand gesture associated with each person (S102).

When the gesture determination section 132 determines that the aforesaid hand gestures coincide with each other (YES in S102), the controller 130 stores the person whose hand gesture was first determined by the gesture determination section 132 as "person A" (priority user) to whom the login is to be permitted (that is, giving a status to log in to the image forming apparatus 15 to the person A), and allows the communication unit 240 to transmit the person A's name and an instruction to display the person A's name to the image forming apparatus 15 (S103).

In the image forming apparatus 15, when the communication unit 23 receives the name of the person A, to whom the login is to be permitted, and the instruction to display the person A's name, the controller 31 allows, by the display controller 33, the display 21 to display the person A's name. At this point, however, the controller 31 of the image forming apparatus 15 does not perform login processing for the person A.

In other words, when the face image of the person is authenticated and the hand gesture of this person coincides with the hand gesture associated with the feature points of the face image stored in the person data storage unit 14, the face image of the person is specified as the face image of the person A to whom the login is to be permitted. Also, the person A's name is displayed on the display 21 of the image forming apparatus 15 and the name of the person A who is to be permitted to log in is notified to each person present around the image forming apparatus 15.

In addition, in specifying the person A to whom the login is to be permitted through the authentication of the face image, the control unit 130 starts clocking of an elapsed time T from the time point of the specification, with a built-in timer (S104), and determines whether the elapsed time T is reached to a prescribed time TA set in advance (for example 20 seconds) (S105).

It is assumed that the person A to whom the login is to be permitted is moving to the front of the image forming apparatus 15 to use the image forming apparatus 15 or is already present in front of the image forming apparatus 15. Therefore, the face authentication section 131 is highly likely to detect the face image of the person A to whom the login is to be permitted in the captured image captured by the camera 12. In addition, because there are cases where a different person further performs a hand gesture after the person A, to whom the login is to be permitted, has performed the hand gesture, the gesture determination section 132 is configured to determine the hand gesture performed by the different person.

For that reason, until the elapsed time T reaches the prescribed time TA (NO in S105), the controller 130 waits for the detection by the face authentication section 131 of the face image of the person in the captured image captured by the camera 12 (NO in S106) and waits for the determination b the gesture determination section 132 of the hand gesture by the different person (NO in S110).

Here, in detecting the face image of the person in the captured image captured by the camera 12 (YES in S106), the face authentication section 131 determines whether the feature points of the detected person's face image coincide with the feature points of the face image of the person A (specified in S103) to whom the login is to be permitted (S107). In other words, the face authentication section 131 determines whether the person who moves to the front of the image forming apparatus 15 or is present in front of the image forming apparatus 15 is identical to the person to whom the log in is to be permitted. Here, in the case where the face image of the person included in the captured image captured by the camera 12 in step S101 has been authenticated by the face authentication section 131, it is detected again in S106 that the captured image captured by the camera 12 has the face image of the person.

When the face authentication section 131 determines that the aforesaid face images coincide with each other (YES in S107), in other words, when the person who moves to the front of the image forming apparatus 15 or is present in front of the image forming apparatus 15 is identical to the person A to whom the login is to be permitted, the controller 130 permits the login to the image forming apparatus 15 to the person A, and transmits login permission information from the communication unit 240 to the image forming apparatus 15, the login permission information indicating that the person A is permitted to log in to the image forming apparatus 15 (S108).

In the image forming apparatus 15, when the communication unit 23 receives the login permission information, the controller 31 permits the use of the image forming apparatus 15 and performs the login processing, thereby allowing, by driving and controlling the image reading unit 25, the image forming unit 26, and so on in accordance with the operation of the operation unit 22 or the touch panel 24, the image forming apparatus 15 to be in a condition where, for example, an image can be formed on a recording sheet.

Then, the controller 130 of the server 13 determines whether there is login waiting (to be described later) (S109). If there is no login waiting (NO in S109), the processing shown in FIG. 5 ends.

When the face authentication section 131 determines that the person who moves to the front of the image forming apparatus 15 or is present in front of the image forming apparatus 15 is not identical to the person A to whom the login is to be permitted, the processing returns to S105 (NO in S107).

Furthermore, after the person A to whom the login is to be permitted has performed the hand gesture, before the elapsed time T reaches the prescribed time TA (NO in S105), when the different person performs a hand gesture without detecting that there is a face image of a person in the captured image captured by the camera 12 by the face authentication unit 131 (NO in S106), the gesture determination section 132 detects the hand gesture of the different person, reads out the hand gesture associated with the feature points of the face image of the different person from the person data storage unit 14, and determines whether the hand gesture of the different person coincides with the read out hand gesture (S110).

Then, when the gesture determination section 132 determines that the aforesaid hand gestures coincides with each other (YES in S110), the controller 130 stores, as the new priority user who is waiting to log in, the name of the different person, and allows the communication unit 240 to transmits the name of the different person and an instruction to display the name to the image forming apparatus 15 (S111).

In the image forming apparatus 15, when the communication unit 23 receives the name of the different person who is waiting to log in and the instruction to display the name, the controller 31 allows, by the display controller 33, the display 21 to display the name of the different person who is waiting to log in together with the name of the person A who has been permitted to log in.

In other words, when the gesture determination section 132 determines that there is the hand gesture associated with the different person, the controller 130 stores the different person as the person waiting to log in. The name of the different person who is waiting to log in is displayed on the display 21 of the image forming apparatus 15, thus, the name of the person waiting to log in is notified to each person present around the image forming apparatus 15.

Here, the gesture determination section 132 further detects a hand gesture of a second different person before the elapsed time T reaches the prescribed time TA (NO in S105) and determines that the hand gesture of the second different person coincides with a prescribed hand gesture read out from the person data storage unit 14 (YES in S110), the controller 130 stores, as the login waiting, the name of the second different person, and allows the communication unit 240 to transmits the name of the second different person waiting to log in and an instruction to display the name to the image forming apparatus 15 (S111). In the image forming apparatus 15, the name of the second different person waiting to log in is displayed on the display 21 of the image forming apparatus 15. Therefore, the person waiting to log in increases to two persons, and the names of the first and second persons waiting to log in and the person A's name who has been permitted to log in are displayed on the display 21 of the image forming apparatus 15.

Thereafter, in the same way as above, each time a hand gesture of further different person is detected by the gesture determination section 132, the controller 31 performs the similar processing. The number of the people waiting to log in increases in the image forming apparatus 15 when the processing is repeated.

If the elapsed time T is determined as being reached the prescribed time TA while S110 or S107 remains "NO" (YES in S105), the controller 130 determines whether the person who is waiting to log in is being stored (S112). When determining that the person waiting to log in is being stored (YES in S112), the controller 130 cancels the status to log in that was given to the person A in S103 (S113), stores, as a new person A to whom the login is newly permitted, the person waiting to log in and whose waiting order is the first (that is, giving the status to log in to the image forming apparatus 15 to the new person A), and allows the communication unit 240 to transmit the name of the new person A to the image forming apparatus 15 (S114). Thereafter, the processing after S104 is repeated.

If the controller 130 determines that no person waiting to log in is being stored (NO in S112), the processing shown in FIG. 5 ends. In other words, if there are no different persons who are waiting to be permitted to log in after the prescribed time TA has passed, the processing shown in FIG. 5 ends.

In the image forming apparatus 15, when the communication unit 23 receives, as described above, the name of the person to whom the login is newly permitted (new priority user), the controller 31 allows, by the display controller 33, the display 21 to display the name of the new person A.

Also in the case where it is determined that there is the login waiting (YES in S109) after the login to the image forming apparatus 15 is permitted in S108, when the communication unit 240 receives, from the image forming apparatus 15, information indicating that the job executed in the image forming apparatus 15 according to the instruction from the person A under the login status is finished, or when the communication unit 240 does not receive the information within a predetermined period (for example, 5 minutes), the controller 130 cancels the status to log in to the image forming apparatus 15 from the person A (specified in S103) to whom the login is to be permitted (S113), stores, as the person to whom the login is newly permitted (new priority user), the person waiting to log in and whose waiting order is the first (that is, giving the status to log in to the image forming apparatus 15 to the new person), and allows the communication unit 240 to transmit the name of the new person to the image forming apparatus 15 (S114). In this case, the elapsed time T in S105 starts at the time point where the controller 130 stores the person waiting to log in and whose waiting order is the first as the person to whom the login is newly permitted (new priority user).

As described thus far, in the present embodiment, when the face image of the person is authenticated and the hand gesture of that person is determined as coinciding with the prescribed hand gesture, the login to the image forming apparatus 15 by that person is permitted. Therefore, without requiring performing a special login operation, it is possible to permit the login to the image forming apparatus 15 only to one person.

In the general system described in the above BACKGROUND, when a plurality of persons enters the management room and a plurality of face images taken by the second camera is authenticated, it is not possible to permit the login to the image forming apparatus to only one person. When the plurality of persons are permitted to use the image forming apparatus, the following defects may be caused: (i) determining who is using the apparatus is impossible; (ii) when the plurality of face images are authenticated by the second camera, there may be a case where a user who is not intended to use the apparatus logs in; and (iii) copy count cannot be correctly reflected.

In contrast, when more than one person is ready to log in, the present embodiment is capable of permitting only the most optimum one person to log in the electronic apparatus.

Also, in the present embodiment, when the face image of more than one person is authenticated, the login to the image forming apparatus 15 is permitted to the person who first performed the hand gesture and whose hand gesture is determined as coinciding with the prescribed hand gesture, so that it is possible to permit the login to the image forming apparatus 15 to the person who initially made the manifestation of intention to use the image forming apparatus 15.

Furthermore, in the present embodiment, if the hand gestures of different persons are determined as coinciding with the prescribed hand gesture after the person whose face image was authenticated and who has performed the hand gesture first, the different persons are determined as waiting for the login, and the login is permitted sequentially to each person in the order of waiting. The image forming apparatus 15 can be thereby used efficiently.

Still further, in the present embodiment, the name of the person A to whom the login is to be permitted (the person whose face image is authenticated and who performs the hand gesture first) and the names of the different persons who are waiting to log in are displayed on the display 21 of the image forming apparatus 15. Accordingly, it is possible to notify nearby people that the persons who are to log in to the image forming apparatus 15 and the person who is to log in next.

In the above embodiment, the name of the person who is to be permitted to log in (identification information) and the names of the different persons who are waiting to log in are displayed on the display 21 of the image forming apparatus 15. Together with this configuration or alternatively, the controller 31 may allow the display 21 to display the face image of the person. In such case, the controller 130 of the server 13 extracts the face image of the person having been authenticated by the face authentication section 131 from the captured image. An instruction to display the extracted face image is transmitted from the server 13 via the communication unit 240 to the image forming apparatus 15.

Furthermore, one kind of the hand gesture is stored for each person in the storage unit 230 of the server 13 in the present embodiment, but a plurality of kinds of the hand gestures may be stored for each person. In this case, when detecting the hand gesture of the person, the gesture determination section 132 reads out from the person data storage unit 14 the hand gesture of the plural kinds associated with the feature points of the face image of the person, and determines whether the detected hand gesture coincides with any of the hand gestures read out.

Also, the storage unit 230 may store a hand gesture common to each person.

Alternatively, the hand gesture of each person may be given different priority (priority to permit the login to the image forming apparatus 15), and the priority may be stored in the storage unit 230 in association with each of the persons. In such case, when determining before the prescribed time TA elapses that the face images of the plurality of persons are authenticated and each of the persons performs the respective hand gestures and the hand gestures are determined as coinciding with the prescribed hand gesture, the controller 130 sequentially permits the login to each person in the order of high priority, regardless of whether the hand gesture is determined as coinciding with the prescribed hand gesture.

When the priority is set such the way, in a state of storing the person waiting to log in, when it is further determined that the face image is authenticated and the hand gesture coincides with the prescribed hand gesture for the person whose priority is set to be the highest, the controller 130 may always set a login waiting order of the person, whose priority is set to the highest priority, to be the first priority.

Alternatively, the plurality of cameras 11 are installed in the room 200 in the above embodiment, but only one camera 11 may be used. In such case, to capture the images of all persons present in the room 200 by one camera 11, a camera that has, for example, a zoom-in and zoom-out function, a pan and tilt function, and a tracking function for tracking a person being imaged, is preferably used as the camera 11.

In the above embodiment, when the feature points of the face image authenticated in the captured image captured by the camera 12 coincide with any feature points of the face image of the person A, specified in S103, to whom the login is to be permitted (YES in S107), the face authentication section 131 performs the permitting processing for the use of the image forming apparatus 15 to the person A. Alternatively, the controller 130 may transmit the login permission information to the image forming apparatus 15 without performing the aforesaid processing on the person A to whom the login is to be permitted.

Further, the configurations and processes of the embodiment described with reference to FIGS. 1 to 5 are merely exemplary, and not intended to limit the configurations and processes of the embodiment of the disclosure. For example, in the above embodiments, the image forming apparatus 15 was referred to as one example of the electronic apparatus in the scope of claims, but the electronic apparatus may be other than the image forming apparatus 15: it may be a medical equipment, a machine tools, and the like, any the electronic apparatuses other than the image forming apparatus 15.

While the present disclosure has been described in detail with reference to the embodiments thereof, it would be apparent to those skilled in the art the various changes and modifications may be made therein within the scope defined by the appended claims.

What is claimed is:
1. A login support system comprising:
an electronic apparatus including a display;
a camera being installed in a room with the electronic apparatus and capturing an inside of the room;
a storage unit including a data table storing pieces of face information, each of the pieces of face information being associated with a respective plurality of persons; and
an information processing apparatus connected to the electronic apparatus, the camera, and the storage unit,
wherein the information processing apparatus includes a control unit,
the control unit includes a processor and acts, when the processor executes a login support control program, as:
a face authentication section extracting a face image of a person from a captured image captured by the camera and, when the extracted face image of the person coincides with any of the pieces of face information that is stored in the storage unit and each associated with the respective plurality of persons, authenticating the extracted face image of the person;
a gesture determination section detecting a gesture of a person on a basis of the captured image captured by the camera, and determining whether the detected gesture coincides with a prescribed gesture; and
a controller permitting, when the face authentication section has authenticated the face image of the person and the gesture determination section has determined that the gesture of the person whose face image has been authenticated coincides with the prescribed gesture, a login to the electronic apparatus to the person,
when the face authentication section has authenticated face images of a plurality of persons and the gesture determination section has determined that each gesture associated with the respective plurality of persons coincides with the prescribed gesture, the controller identifies a person who was determined first that the face image is authenticated and the gesture coincides with the prescribed gesture, and permits the login to the electronic apparatus to the person who was determined first, the camera is installed plurality in number, and any one out of the plurality of cameras is disposed at a position capable of picking up an image of a person who moves to the front of the electronic apparatus,
the face authentication section determines whether the face image of the person who was determined first coincides with a face image of the person captured by the camera disposed at the position,
before a predetermined time elapses from a point in time at which the person who was determined first is identified, if the face authentication section determines that the face image of the person who was determined first coincides with the face image of the person captured by the camera disposed at the position, the controller permits the login to the electronic apparatus to the person who was determined first,
the storage unit further stores pieces of identification information, each of the pieces of identification information being associated with the respective plurality of persons,
the controller allows the display to display the identification information of the person permitted to log in to the electronic apparatus, the identification information being read out from the storage unit,
before the predetermined time elapses from the point in time at which the person who was determined first is identified, if the face authentication section does not determine that the face image of the person who was determined first coincides with the face image of the person captured by the camera disposed at the position, the controller does not permit the login to the electronic apparatus to the person who was determined first, and
before the predetermined time elapses from the point in time at which the person who was determined first is identified, if a face image of a person other than the person who was determined first is authenticated and a gesture coincides with the prescribed gesture, the controller determines that a person who was determined next following the person who was determined first is a first person waiting to log in, stores identification information of the first person waiting to log in, and allows the display to display the identification information of the person permitted to log in to the electronic apparatus and the identification information of the first person waiting to log in, and
when receiving, from the electronic apparatus, information indicating that a job executed according to an instruction from the person permitted to log in to the electronic apparatus is finished, or when not receiving the information within a predetermined period, the controller identifies the first person waiting to log in as a person to whom the login is to be newly permitted, and before a predetermined time elapses from a point in time at which the person to whom the login is to be newly permitted is identified, if the face authentication section determines that a face image of the first person waiting to log in coincides with the face image of the person captured by the camera disposed at the position, the controller permits the login to the electronic apparatus to the first person waiting to log in.
2. The login support system according to claim 1, wherein the storage unit stores, for each person, gestures together with the face image, each of the gestures being associated with the respective plurality of persons, and
the gesture determination section defines the gesture associated with the person associated with the face image authenticated by the face authentication section as a prescribed gesture, and determines whether the gesture of the person detected on the basis of the captured image captured by the camera coincides with the prescribed gesture.

3. The login support system according to claim 1, wherein a plurality of gestures having different priorities is preset as the prescribed gesture, and when the face authentication section has authenticated face images of a plurality of persons and the gesture determination section has determined that each gesture associated with the respective plurality of persons coincides with the prescribed gesture, the control unit permits the login to the electronic apparatus preferentially to a person who performed a gesture that is determined as coinciding with the prescribed gesture having a highest priority among the plurality of persons whose face images are authenticated.

4. The login support system according to claim 1, wherein the electronic apparatus is an image forming apparatus, the image forming apparatus comprising an image forming unit that forms an image on a recording medium.

5. The login support system according to claim 1, wherein
the storage unit stores, for each person, a hand gesture together with the face image, the hand gesture being as each of the gesture associated with the respective plurality of persons, and
the gesture determination section uses the hand gesture associated with the person associated with the face image authenticated by the face authentication section as a prescribed hand gesture, and determines whether the hand gesture of the person detected on the basis of the captured image captured by the camera coincides with the prescribed hand gesture.

6. The login support system according to claim 1, wherein
the storage unit stores, as the prescribed gesture, a plurality of gestures for each of the plurality of persons, and
the gesture determination section detects the gesture of the person on the basis of the captured image captured by the camera, and determines whether the detected gesture coincides with any of the plurality of gestures stored in the storage unit.

* * * * *